No. 776,958. PATENTED DEC. 6, 1904.
J. T. STORY.
LIQUID MEASURE AND FILTER.
APPLICATION FILED AUG. 15, 1903. RENEWED JUNE 2, 1904.
NO MODEL. 2 SHEETS—SHEET 1.
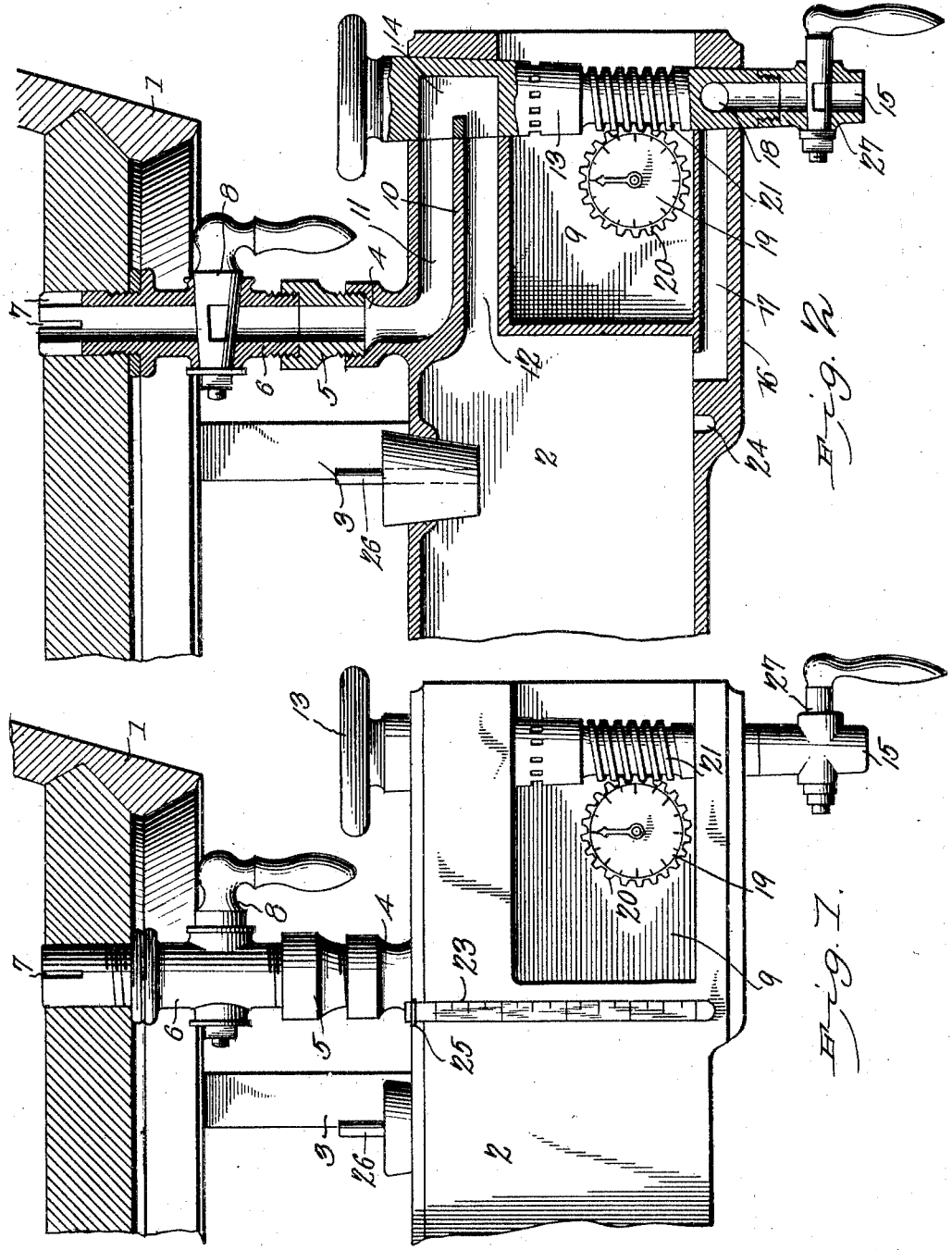
Witnesses
J. T. Story, Inventor
by C. A. Snow & Co.
Attorneys No. 776,958. PATENTED DEC. 6, 1904.
J. T. STORY.
LIQUID MEASURE AND FILTER.
APPLICATION FILED AUG. 15, 1903. RENEWED JUNE 2, 1904.
NO MODEL. 2 SHEETS—SHEET 2.
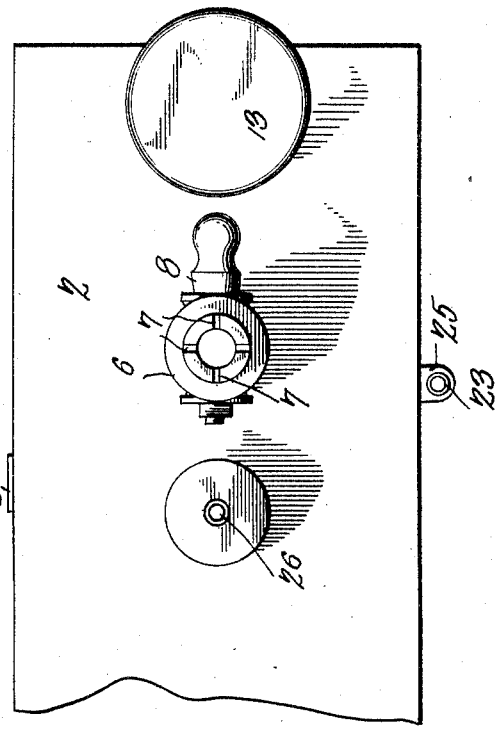
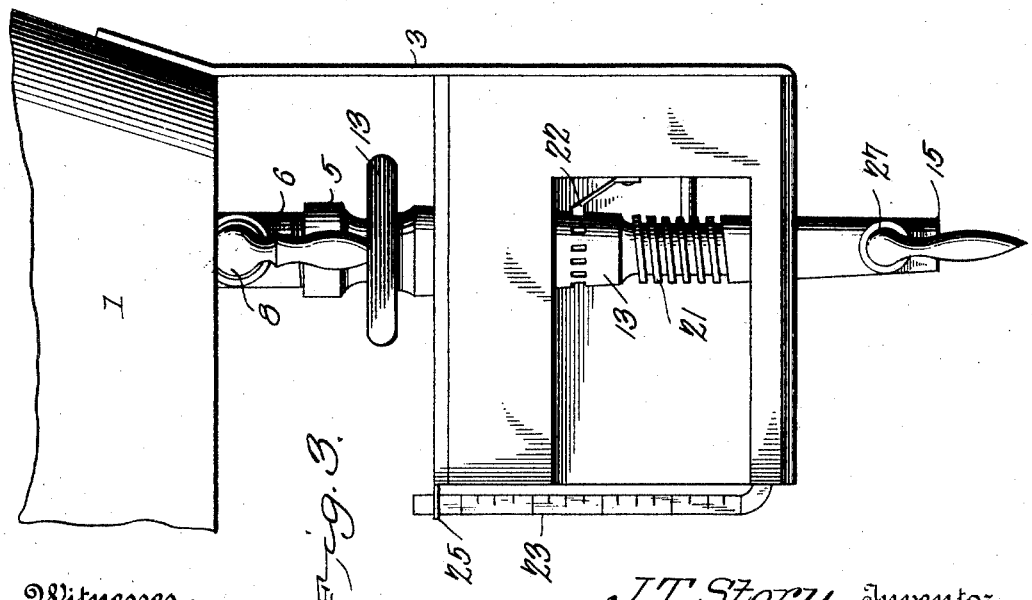
J. T. Story, Inventor.
Witnesses No. 776,958. Patented December 6, 1904.

UNITED STATES PATENT OFFICE.

JIM TOM STORY, OF GREENVILLE, TEXAS.

LIQUID MEASURE AND FILTER.

SPECIFICATION forming part of Letters Patent No. 776,958, dated December 6, 1904.

Application filed August 15, 1903. Renewed June 2, 1904. Serial No. 210,902. (No model.)

*To all whom it may concern:*

Be it known that I, JIM TOM STORY, a citizen of the United States, residing at Greenville, in the county of Hunt and State of Texas, have invented a new and useful Liquid Measure and Filter, of which the following is a specification.

This invention relates to certain useful improvements in measuring vessels or faucets.

One object of the invention is to provide a simple, inexpensive, and efficient device of this character by means of which wines, oils, and other liquids may be accurately and rapidly drawn or transferred from storage-tanks, barrels, casks, and other receptacles in predetermined quantities without resorting to the use of individual measures, thereby saving time and preventing evaporation and waste of the liquids.

A further object of the invention is to provide means for determining the exact quantity of liquid withdrawn from the receptacle and indicating or registering the amount on a suitable dial or indicator, to provide a visual indicator or gage to determine the quantity of liquid in the measuring vessel, and to provide means whereby all the liquid or any part thereof may be withdrawn from said vessel when desired without the liability of the vessel being refilled during the operation.

A further object is to provide means for withdrawing the entire contents of the tank or cask without stirring or otherwise agitating the liquid therein.

The invention consists in the construction and novel combination and arrangement of parts hereinafter fully described, illustrated in the accompanying drawings, and pointed out in the claims hereto appended, it being understood that various changes in form, proportions, and details of construction may be resorted to without departing from the spirit or sacrificing any of the advantages of the invention.

In the accompanying drawings, Figure 1 is a side elevation of my improved measuring vessel, showing the same attached to a barrel or cask. Fig. 2 is a longitudinal section of the same. Fig. 3 is a front elevation, and Fig. 4 is a top plan view of the measuring vessel detached.

Similar numerals of reference indicate corresponding parts in all the figures of the drawings.

1 designates a liquid-containing receptacle—a cask in the present instance—to which is attached my improved measuring vessel 2. The measuring vessel, which may be of any desired shape or configuration, is preferably substantially rectangular, as shown, being supported from the bottom of the cask by means of hooks or straps 3.

Threaded in a socket 4, preferably formed integral with the vessel 2, is a nipple 5, adapted to receive one end of a coupling 6, the opposite end thereof being screwed in the bottom of the cask and provided with a series of longitudinally-disposed slots or openings 7, which permit the withdrawal of the entire contents of the cask without stirring or otherwise agitating the liquid. The coupling 6 is provided with a turning plug 8, by means of which the supply of liquid to the vessel 2 may be regulated at will.

The front end of the vessel 2 is provided with a pocket or compartment 9, open at the front, as shown, and within which is located the registering mechanism, which will be referred to hereinafter. A horizontally-disposed plate or partition 10, preferably formed integral with the vessel, is arranged above the compartment 9, defining passages 11 and 12, through which the liquid flows from the cask into said vessel.

Mounted in suitable bearings in the front end of the vessel 2 is a turning plug 13, the upper end of which is provided with port 14, adapted to register with the passages 11 and 12, the lower end of the plug passing through the compartment 9 and the bottom of the vessel being provided with a nozzle 15. The bottom of the vessel 2 is provided at a point adjacent its front end with an enlargement 16, formed with a longitudinally-disposed bore or passage 17, one end of which communicates with the interior of said vessel, the opposite end thereof being adapted to register with a port 18 in the upper part of the nozzle 15. The ports 14 and 18 are arranged at right angles to each other, as shown, so that when the upper port is open the lower one will be closed, and vice versa.

In order to register the exact quantity of liquid withdrawn from the cask into the vessel 2, I provide a recording device consisting of a dial-plate 19, provided with a series of graduations corresponding to pints, quarts, gallons, or quantities equal to the capacity of the vessel. Coöperating with the dial is a hand or pointer secured to a toothed wheel 20, mounted in any suitable manner in the compartment 9, said wheel being adapted to engage a thread or worm 21, formed on the plug 13 and indicate the amount of liquid admitted to the vessel when said plug is turned. The pitch of the thread or worm 21 and the distance between the teeth on the wheel 20 are so proportioned that one revolution of the plug 13 will cause the pointer to move one space, indicating the same on the dial. It will thus be seen that by turning the plug in the proper direction the port 14 will register with the passages 11 and 12, while the port 18 will be closed, permitting the liquid to flow from the cask through the passages 11 and 12 into the measuring vessel and filling the same. At the same time the worm or thread 21 will cause the pointer to move one half-space, while by turning the plug to close the port 14, thus completing one revolution, the port 18 will be opened and the pointer moved another half-space, thereby making it advance one space every time the vessel is filled. In order to prevent the plug being turned backward by unscrupulous persons, and thereby changing the number of gallons recorded on the dial, I provide a spring-pawl 22, secured in any suitable manner to the wall of the measuring vessel and within the compartment 9, the end of said pawl engaging an annular row of ratchet-teeth formed on the plug 13.

As a means for visually determining the quantity of liquid in the vessel 2 and to permit small quantities to be drawn therefrom when desired I provide an indicator or gage 23, suitably graduated to correspond to the capacity of the measuring vessel, one end of said gage communicating with an opening 24 in the bottom of the vessel, the opposite end thereof being supported by a clip or loop 25.

An air tube or vent 26 communicates with the vessel 2, the upper end thereof being open to permit the escape of air as vessel is being filled.

The nozzle 15 of the plug 13 is provided with cock 27, which permits the contents of the vessel or any part thereof being drawn off when desired, said plug also preventing the escape of the fluid after the vessel has been filled and the port 18 opened.

The construction of my device will be readily understood, and the operation thereof is as follows: The plug 8 being open, when it is desired to draw off a predetermined quantity of liquid the plug 13 is turned a half-revolution, causing the port 14 to register with the passages 11 and 12, and thereby permitting the liquid to flow from the cask through the pipe 6, passages 11 and 12, and port 14 into the measuring vessel, the movement of the plug at the same time closing the port 18 and causing the pointer to move one half-space on the dial. To deliver the vessel of its contents, the cock 27 is opened and the plug 13 turned another half-revolution, closing the port 14 and permitting the liquid to flow through the port 18 and nozzle 15, the hand or pointer moving another half-space to the graduation 1, indicating that one gallon has passed from the cask into the measuring vessel. The amount of liquid in the vessel may be determined at any time by means of the gage 23, and any desired quantity may be withdrawn from the vessel when the port 14 is closed through the cock 18 without affecting the registering mechanism, said register only operating when the plug 13 is turned, and merely indicating the amount of liquid transferred from the cask to the measuring vessel.

From the foregoing description it will be seen that I have provided an exceedingly simple, inexpensive, and efficient measuring device by means of which the entire liquid contents of a cask or other receptacle may be transferred in predetermined quantities without agitating the liquid in which the amount of liquid transferred is accurately registered, which will effectively prevent unscrupulous persons from tampering with the register, and which will indicate the amount of liquid in the measuring vessel at all times and permit the withdrawal of any part thereof without effecting the registering mechanism.

Having thus described the invention, what I claim, and desire to secure by Letters Patent, is—

1. The combination with a receptacle, of a measuring vessel, a valve provided with a terminal discharge-nozzle disposed within the vessel, registering mechanism coöperating with the valve, and an independent controlling-valve arranged within the nozzle for regulating the discharge of liquid from the vessel.

2. The combination with a receptacle, of a measuring vessel, a valve provided with a terminal discharge-nozzle disposed within the vessel, registering mechanism operable by the valve, means for indicating the quantity of liquid within the vessel, and an independent controlling-valve arranged within the nozzle for regulating the discharge of liquid from the vessel.

3. The combination with a receptacle, of a measuring vessel, a valve having oppositely-disposed ports and provided with a discharge-nozzle arranged within the vessel, registering mechanism operable by the valve, means for indicating the quantity of liquid within the vessel, means for regulating the supply of liquid from the receptacle and an independent controlling-valve arranged within the nozzle for regulating the discharge from the vessel.

4. The combination with a receptacle, of a measuring vessel having supply and discharge passages, a valve provided with a terminal discharge-nozzle and having oppositely-disposed ports adapted to register with said passages, registering mechanism operable by the valve, means for indicating the quantity of liquid in the vessel and means for regulating the discharge of liquid from the nozzle.

5. The combination with a receptacle, of a measuring vessel having supply and discharge passages, a turning plug provided with a nozzle and having oppositely-disposed ports adapted to register with said passage for regulating the quantity of liquid delivered to the vessel, registering mechanism operable by the plug, and a cock for regulating the discharge of liquid from the nozzle.

6. The combination with a receptacle, of a measuring vessel having supply and discharge openings, a turning plug provided with a nozzle and having oppositely-disposed ports adapted to register with said passages, a cock for regulating the supply of liquid to the plug, registering mechanism operable by the plug, an indicator secured to the vessel, and a cock for regulating the discharge of liquid from the nozzle.

7. The combination with a receptacle, of a measuring vessel, a valved connection between the vessel and the receptacle, said vessel being provided with supply and discharge passages, a turning plug provided with a discharge-nozzle and having oppositely-disposed ports adapted to register with said passages, an air-vent, registering mechanism operable by the plug, and an independent controlling-valve arranged within the nozzle for regulating the discharge of liquid from the vessel.

8. The combination with a receptacle, of a measuring vessel, a tube connecting the vessel with the receptacle and provided at its upper end with slots or openings, said vessel having supply and discharge openings, a turning plug provided with a terminal discharge-nozzle and having oppositely-disposed ports adapted to register with said passages, registering mechanism operable by the plug, and an independent controlling-valve arranged within the nozzle for regulating the discharge of liquid from the vessel.

9. The combination with a receptacle, of a measuring vessel having a pocket or compartment in the front wall thereof and provided with supply and discharge passages, a turning plug having ports arranged at right angles to each other adapted to register with said passages, said plug being provided with a terminal nozzle and having a worm formed thereon, a toothed registering-disk revolubly mounted within the compartment and adapted to engage the worm, and a cock for regulating the discharge of liquid from the nozzle.

In testimony that I claim the foregoing as my own I have hereto affixed my signature in the presence of two witnesses.

JIM TOM STORY.

Witnesses:
H. S. ELLIS,
J. R. McGRAW.